United States Patent [19]
Wirtz et al.

[11] Patent Number: 5,810,335
[45] Date of Patent: Sep. 22, 1998

[54] HEIGHT ADJUSTING SHOCK ABSORBER STRUT FOR A MOTOR VEHICLE

[75] Inventors: Joachim Wirtz, Stuttgart; Helmut Luncz, Korntal-Münchingen, both of Germany

[73] Assignee: Mercedes-Benz AG, Stuttgart, Germany

[21] Appl. No.: 802,586

[22] Filed: Feb. 19, 1997

[30] Foreign Application Priority Data

Feb. 24, 1996 [DE] Germany ............... 196 06 991.2

[51] Int. Cl.⁶ ............................................. B60G 17/00
[52] U.S. Cl. ..................... 267/221; 267/34; 267/64.26
[58] Field of Search ........................... 267/33, 34, 64.16, 267/64.26, 64.28, 221, 217; 188/299, 322.21; 280/6.12, 696, 701, 707, 710, 724, 840

[56] References Cited

U.S. PATENT DOCUMENTS

| | | |
|---|---|---|
| 4,159,105 | 6/1979 | Laan et al. . |
| 4,372,545 | 2/1983 | Federspiel .......................... 267/221 |
| 4,830,395 | 5/1989 | Foley . |
| 5,009,451 | 4/1991 | Hayashi et al. .......................... 280/724 |
| 5,058,868 | 10/1991 | Sirven ...................................... 280/710 |
| 5,098,120 | 3/1992 | Hayashi et al. .......................... 280/710 |
| 5,401,053 | 3/1995 | Sahim et al. ............................. 267/33 |

FOREIGN PATENT DOCUMENTS

| | | |
|---|---|---|
| 23 60 149 | 8/1979 | Germany . |
| 42 31 641 | 3/1994 | Germany . |

*Primary Examiner*—Chris Schwartz
*Attorney, Agent, or Firm*—Klaus J. Bach

[57] ABSTRACT

In a height-adjustable shock absorber strut for a vehicle wherein a shock absorber damping cylinder is operatively attached to the vehicle wheels and a piston rod interacting with the damping cylinder extends from the damping cylinder and is provided at its free end with a mounting structure for attachment to a vehicle body and a spring is disposed between the damping cylinder and a spring support disposed on the piston rod, the spring support structure comprises a support member which is axially movably mounted on the piston rod for controlling the support location of the spring and, consequently, the height of the strut under vehicle load.

2 Claims, 1 Drawing Sheet

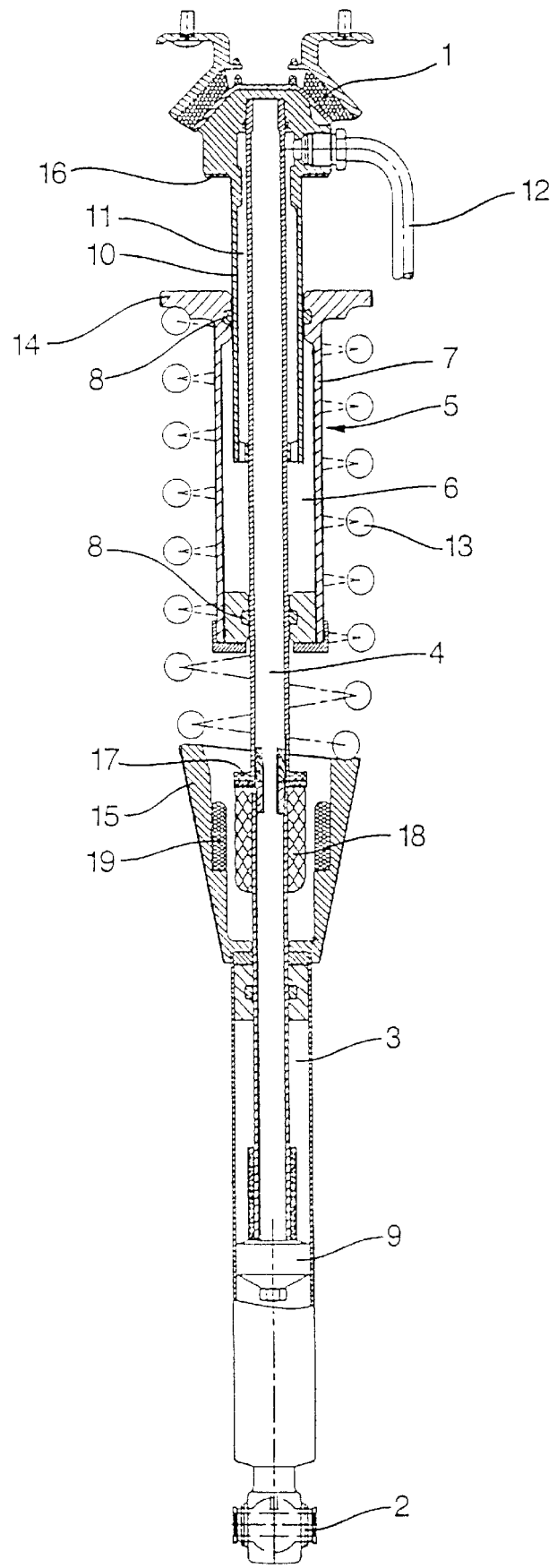

HEIGHT ADJUSTING SHOCK ABSORBER STRUT FOR A MOTOR VEHICLE

BACKGROUND OF THE INVENTION

The invention relates to a spring shock absorber strut disposed between the wheels and the body of a motor vehicle including a shock absorber and a spring for supporting the body.

Such a device is known, for example, from DE 42 31 641 A1. In that publication, the movable part of a hydraulic adjusting device slides over a cylinder which is fixedly connected to the vehicle body. The shock absorber with, inter alia, its damping cylinder is located within this cylinder. Located between the movable element of the hydraulic adjusting device and the cylinder which is rigidly connected to the body of the vehicle is an annular operating space of the adjusting device, which operating space is filled with hydraulic fluid and is sealed by means of annular seals provided at the axial ends of the movable element of the adjusting device, between the movable element and the cylinder which is fixedly connected to the vehicle body. Since the cylinder which is fixedly connected to the vehicle body must accommodate the damping cylinder of the shock absorber, it has a relatively large outside diameter. As a result, the annular seals of the movable element of the adjusting device must have a correspondingly large circumference, thus causing comparatively high friction forces when the movable element is displaced. Such high friction forces are disadvantageous and undesirable in devices which are responsible for the control and handling characteristics of a vehicle.

A shock absorber strut as shown in DE 23 60 149 also has the disadvantage of relatively high friction forces during actuation of a hydraulic adjusting device. In that publication, the hydraulic adjusting device includes sealing rings on the outer surface of the damping cylinder of the shock absorber which are relatively large in diameter and whose axial distance from one another changes and is smallest under highest load when bending forces are greatest.

It is the object of the present invention to provide a height adjustable shock absorber strut which is subjected to relatively low friction forces during operation.

SUMMARY OF THE INVENTION

In a height-adjustable shock absorber strut for a vehicle wherein a shock absorber damping cylinder is operatively attached to the vehicle wheels and a piston rod interacting with the damping cylinder extends from the damping cylinder and is provided at its free end with a mounting structure for attachment to a vehicle body and a spring is disposed between the damping cylinder and a spring support structure disposed on the piston rod, the spring support structure comprises a support member which is axially movably mounted on the piston rod for controlling the support location of the spring and, consequently, the height of the strut under vehicle load.

Preferably, the movable element is a cylindrical housing having one end sealed around the piston rod area of relatively small diameter and the other end around an area of the piston rod of increased diameter formed at the end of the piston rod removed from the damping cylinder by a sleeve structure through which fluid can be admitted from the stationary top of the strut to the cylinder chamber formed between the sealed ends of the movable element around the piston rod.

An exemplary embodiment of the invention is described below on the basis of the accompanying drawing.

BRIEF DESCRIPTION OF THE DRAWINGS

The sole FIGURE is an axial, cross-sectional view of the shock absorber strut according to the invention.

DESCRIPTION OF A PREFERRED EMBODIMENT

The shock absorber strut has a body-side rubber support joint 1 supporting a vehicle body (not illustrated) and a wheel-side joint 2 on a wheel-support component (likewise not illustrated), such as an axle.

The strut includes a damping cylinder 3 of a shock absorber adjacent the wheel-side joint 2, while the piston rod 4 of the shock absorber is connected to the body-side support joint 1. The piston rod 4 projects from the damping cylinder 3 over a relatively large rod length. Within this rod length, a hydraulic height adjustment device 5 is disposed on the piston rod 4. The purpose of this hydraulic adjusting device 5 is to change the body height of the vehicle and to adapt to the respective current operating conditions. By means of such an adjusting device, it is possible to adapt to yaw and rolling movements and to compensate for inclined positions of the vehicle body. How this can be done specifically with height adjustable vehicle suspensions is well known and is described in detail, for example, in DE 42 31 641 A1, assigned to the parent company of the assignee of the present application.

The adjusting device 5 has a cylindrical housing enclosing an operating space 6 and supported on the piston rod 4 so as to be axially movable whereby the volume of a hydraulic operating space 6 is changed. The housing 7 is sealed at its axial ends relative to the piston rod 4 by means of annular seals 8 to provide a sealed termination of the hydraulic operating space 6. The lower one of these two seals 8 is disposed in an area of the piston rod 4 in which the latter has a first diameter rod portion which remains the same all the way to a displacement piston 9 at the end of the piston rod 4 inside the damping cylinder 3. The upper seal 8, in contrast, is disposed around the piston rod 4 in an area with a larger second diameter of the piston rod. The larger second diameter is formed by an axially extending sleeve structure 10. An annular gap 11 between the sleeve structure 10 and the piston rod 4 forms a hydraulic fluid supply passage to and from the hydraulic operating space 6. The annular gap 11 is in communication, via a line 12, with a controlled or regulated hydraulic fluid storage space (not illustrated).

By changing the volume of the hydraulic operating space 6, the housing 7 moves along the piston rod 4 and, at a given load, thereby causes the distance between the two joints 1 and 2 to change. With the volume of the hydraulic operating space 6 kept constant, the cylindrical housing 7 of the hydraulic adjusting device 5 is functionally fixed to the piston rod 4.

The vehicle body rests on the damping cylinder 3 of the shock absorber by way of the spring 13 which is supported on an annular collar 14. The annular collar 14 on the cylindrical housing 7 forms the body-side abutment of the spring 13, while the wheel-side abutment 15 is a bell-shaped annular collar 15 which is fixedly connected to the upper end of the damping cylinder 3. During up and down movement of a wheel and a corresponding deflection or rebound of the spring 13, only the damping cylinder 3 moves with the vehicle wheel while the piston rod 4 remains virtually at rest. With the adjusting device 5 inactive, also the cylinder 7 and the collar 14 remain stationary with respect to the rod 4.

The cylindrical housing 7 of the hydraulic adjusting device 5 can be axially displaced by changing the volume of the hydraulic operating space 6 between the stops 16 and 17 of the piston rod 4. In this area, the height of the vehicle body, that is to say the distance between the two joints 1 and 2, can be changed. To limit the oscillation amplitude of the shock absorber, a further padded stop 18 is provided on the piston rod 4 opposite the stop 17 which can strike against the damping cylinder 3.

A padded stop 19 serves to engage the bottom of the cylindrical housing 7 to limit upward movement of the damping cylinder 3 in order to prevent any contact between the spring coils, which might otherwise be possible at the maximum stroke of the adjusting device 7, that is, with a full load, and maximum upward movement of the damping cylinder 3.

The piston rod 4 may be composed of a plurality of individual elements and has parts with different diameters over its length. In the exemplary embodiment shown, the piston rod 4 comprises two parts over its length, each being of tubular design.

What is claimed is:

1. A height adjustable shock absorber strut to be mounted between the wheels and the body of a motor vehicle, said strut comprising a shock absorber having a wheel-side damping cylinder for attachment to the vehicle wheels and a body-side piston rod interacting with said wheel-side damping cylinder and having a vehicle body attachment end to be attached to a vehicle body, an axially extending sleeve structure disposed on said piston rod at the body-side end thereof so as to provide for a section at the body-side end of said piston rod having a larger diameter than said piston rod, a spring disposed between a spring support structure mounted on said body-side piston rod, and a wheel-side damping cylinder support structure, said spring support structure comprising a cylinder housing supported on and disposed in sealed relationship with, said sleeve structure and said piston rod so as to be axially slideable thereon and hydraulic fluid supply means for supplying hydraulic fluid to said sleeve structure for controlling the support location of said cylinder housing with said spring support structure on said piston rod and said sleeve structure of said shock absorber strut and, together therewith, the height of said strut under the load of said vehicle.

2. A shock absorber strut according to claim 1, wherein said sleeve structure includes a passage for admitting said hydraulic fluid to said cylinder housing and said means for admitting said hydraulic fluid are attached to said sleeve structure.

* * * * *